(12) United States Patent
Hu et al.

(10) Patent No.: US 10,990,643 B2
(45) Date of Patent: Apr. 27, 2021

(54) AUTOMATICALLY LINKING PAGES IN A WEBSITE

(71) Applicant: Microsoft Technology Licensing, LLC, Redmond, WA (US)

(72) Inventors: Qingbo Hu, San Jose, CA (US); Huan Hoang, San Jose, CA (US); Yongzheng Zhang, San Jose, CA (US); Chia Lung Kao, Dublin, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 482 days.

(21) Appl. No.: 15/941,261

(22) Filed: Mar. 30, 2018

(65) Prior Publication Data
US 2019/0303503 A1 Oct. 3, 2019

(51) Int. Cl.
*G06F 16/00* (2019.01)
*G06F 16/958* (2019.01)
*G06N 20/00* (2019.01)
*G06F 16/9535* (2019.01)

(52) U.S. Cl.
CPC ........ *G06F 16/958* (2019.01); *G06F 16/9535* (2019.01); *G06N 20/00* (2019.01)

(58) Field of Classification Search
CPC ............................ G06F 16/958; G06F 16/9535
USPC ........................................................ 707/726
See application file for complete search history.

(56) References Cited

U.S. PATENT DOCUMENTS

2008/0109881 A1* 5/2008 Dasdan ................. G06F 16/955
  726/4
2010/0250537 A1* 9/2010 Van De Par .......... G06F 16/355
  707/737

OTHER PUBLICATIONS

Armstrong, Brian, "7 Reasons Internal Link Structure of Your Website Matters for SEO", Retrieved from: https://www.1stonthelist.ca/blog/7-reasons-internal-link-structure-of-your-website-matters-for-seo/, Mar. 20, 2017, 4 Pages.

(Continued)

*Primary Examiner* — Thu Nguyet T Le
(74) *Attorney, Agent, or Firm* — Hickman Becker Bingham Ledesma LLP

(57) ABSTRACT

Techniques for automatically linking pages in a web site are provided. In one technique, training data for a machine-learned scoring model is generated that comprises a plurality of features related to content items. The training data comprises multiple entries, each corresponding to a different content item in a first set of content items. For each entry, a corresponding label is based on a ranking of the corresponding content item in one or more search engine results. The machine-learned scoring model is trained based on the training data. For each content item in a second set of content items, multiple attribute values associated with that content item are input into the machine-learned scoring model, which generates a result. Based on multiple results, determining, for a particular web page, a strict subset of the second set of content items to which the particular web page will include one or more links.

20 Claims, 5 Drawing Sheets

(56) References Cited

OTHER PUBLICATIONS

Davies, Dave, "Optimizing your Internal Link Structure", Retrieved from: https://searchengineland.com/optimizing-internal-link-structure-256709, Aug. 24, 2016, 17 Pages.

Schmitz, Tom, "Everything You Need to Know About Seo Web Structure & Internal Links", Retrieved from: https://searchengineland.com/everything-you-need-to-know-about-seo-web-structure-internal-links-110994, Feb. 16, 2012, 8 Pages.

* cited by examiner

AUTOMATICALLY LINKING PAGES IN A WEBSITE

CROSS-REFERENCE TO RELATED APPLICATIONS

This application is related to U.S. patent application Ser. No. 15/444,414, filed Feb. 28, 2017, the entire contents of which is hereby incorporated by reference as if fully set forth herein.

TECHNICAL FIELD

The present disclosure relates to automatically changing the link structure of a website based on attributes related to content items to which web pages of the website can link.

BACKGROUND

Many web sites have a complex link structure that links many web pages together. Some web sites include so many possible web pages, that it is impossible to include a link to all of them at the same time. Such web pages will only be viewed if a website visitor is searching for them, such as through a search feature provided by the website. Thus, one problem faced by administrators of such websites is deciding which web pages (or content items generally) will be linked to by various web pages of the corresponding website. One factor that administrators consider in selecting web pages in which to link is search engine optimization (or SEO). SEO is the process of affecting the online visibility of a website or a web page in a search engine's search results.

However, an approach for considering SEO involve manually implementing "rules" (such as better utilizing anchor text) that are summarized from empirical studies of existing linkage structure of web pages and their corresponding search ranking results. Such an approach does not actively adapt to the changes made by search engines that may significantly change ranking results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for automatically determining content items to which a web page of a web site should link. Feature (or attribute) values of each content item are identified. The feature values are used to compute a value that is used to rank the content items. The computation may be performed by a rule-based model or a machine-learned model that is generated based on the ranking of (e.g., other) content items within search engine result pages generated by one or more search engines. A search engine results page contains links to multiple content items, including content items that are not part of the website. Generally, if a particular content item of the website is ranked relatively high within a search engine results page, then that particular content item, and other content items that are similar to the particular content item, should be linked to by other web pages. Machine-learning techniques may be used to "learn" weights of different features of a content item, which weights can then be used to score multiple content items to which other web pages may link.

Example System

Figure 1:
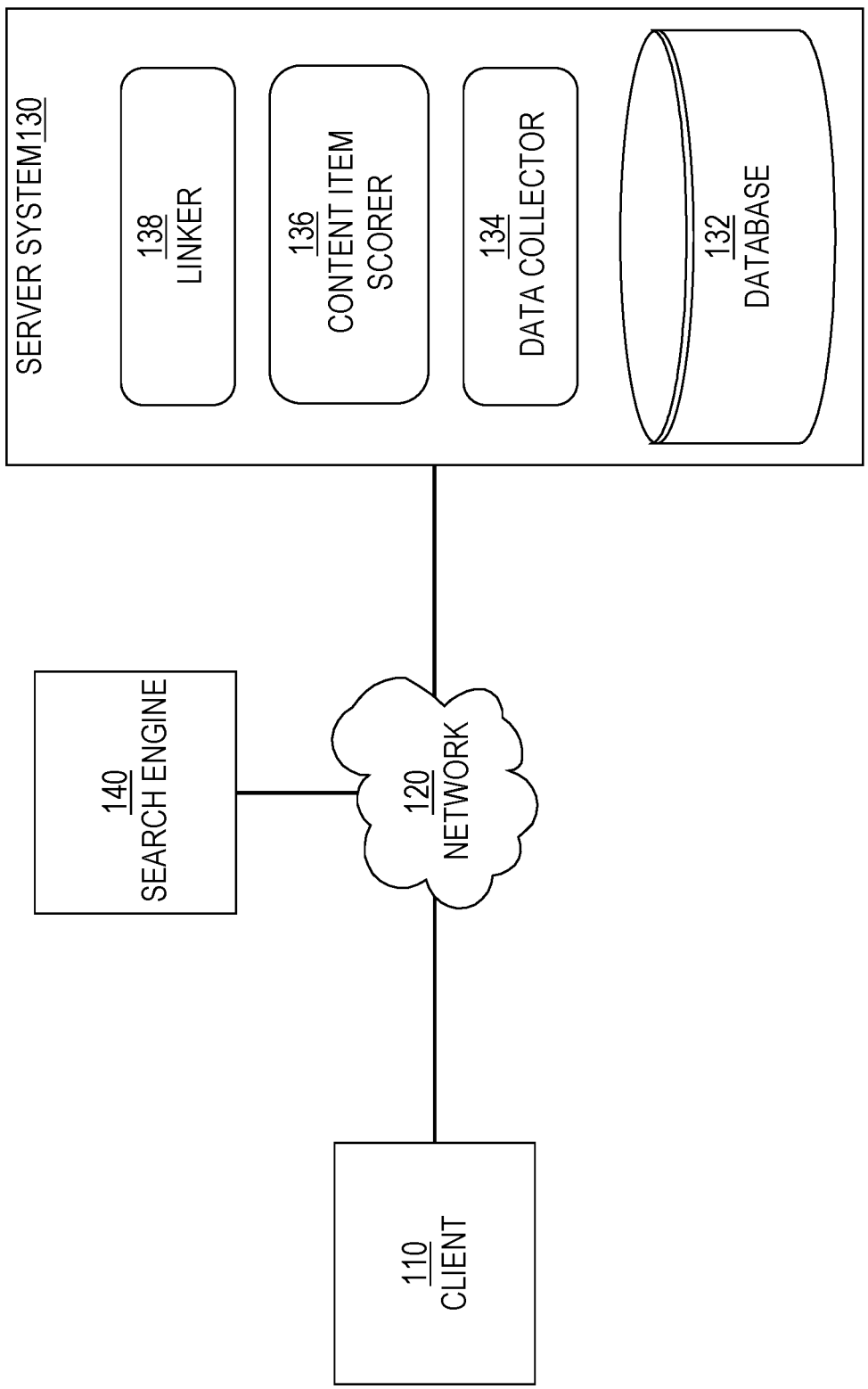
FIG. 1 is a block diagram that depicts an example system for determining content items to which one or more web pages of a web site should link, in an embodiment.

FIG. 1 is a block diagram that depicts an example system 100 for determining content items to which one or more web pages of a web site should link, in an embodiment. System 100 includes a client device 110, a network 120, a server system 130, and a search engine 140.

Client 110 is an application or computing device that is configured to communicate with server system 130 over network 120. Although only a single client 110 is depicted, system 100 may include multiple clients that interact with server system 130 over network 120. Examples of computing devices include a laptop computer, a tablet computer, a smartphone, a desktop computer, and a Personal Digital Assistant (PDA). An example of an application includes a dedicated application that is installed and executed on a local computing device and that is configured to communicate with server 130 over network 120. Another example of an application is a web application that is downloaded from server system 130 and that executes within a web browser executing on a computing device. Client 110 may be implemented in hardware, software, or a combination of hardware and software.

Network 120 may be implemented on any medium or mechanism that provides for the exchange of data between client 110 and server system 130. Examples of network 120 include, without limitation, a network such as a Local Area Network (LAN), Wide Area Network (WAN), Ethernet or the Internet, or one or more terrestrial, satellite or wireless links.

Server System

Server system 130 includes a database 132, a data collector 134, a content item scorer 136, and a linker 138. Server system 130 may be implemented on a single computing device or on multiple computing devices. Each of data collector 134, content item scorer 136, and linker 138 may be implemented in software, hardware, or any combination of software and hardware. Although depicted separately, data collector 134, content item scorer 136, and linker 138 may be implemented as one component.

Database 132 stores content items, data that is used to generate web pages of a particular web site (that may be hosted by server system 130), search results, and/or data about accesses to, and user interactions with, the content items. A web page is a content item that contains one or more links that link to one or more content items. A web page may be linked to by one or more other web pages. A content item might not have any links to other content items. Example content items include a web page, a text file, an audio file, a video file, and an executable.

Although only one search engine is depicted, system 100 may include multiple search engines. Thus, server system 130 may retrieve search results (and, potentially other data) from multiple search engines. Search engine 140 may be a third-party search engine. Examples of search engine 140 include Bing, Ask, and search engines provided by Google, Yahoo!, Baidu, and AOL.

The search results stored in database 132 are results of searches that have been previously performed by search engine 140. Each search was performed based on one or more keywords. A search may be initiated by server system 130 generating and transmitting, to search engine 140 over network 120, an HTTP request that contains one or more keywords and a Uniform Resource Locator (URL) of the search engine 140. Keywords are strings of characters that the party or entity that manages server system 130 hopes results in a search engine result that contains highly ranked web pages from a web site hosted by server system 130.

A search engine result may contain multiple search result entries, each entry corresponding to a particular content item (e.g., web page). A search engine result may comprise one or more search result pages, where each search result page includes one or more entries. If the number of entries cannot fit within a single search results page, then the search engine result may comprise multiple search result pages, each linked by one or more other search result pages in the search engine result. A search engine result may be implemented in an infinite scroll page, where additional search result entries are displayed as a user scrolls down (or through) the "single" search results page.

In database 132, a search result data item indicates (or identifies) a content item (e.g., using content item identifier) and position data of the content item. Position data may include a search results page number (identifying which page of a search engine result the content item appeared) and/or a ranking value that indicates where the content item appeared in a search engine result relative to other content items identified as a result of the corresponding search, such as first, second, third, one hundredth, etc. A search result data item may also include or indicate a timestamp of when the corresponding search result was generated or returned to server system 130.

Data Collector

Data collector 134 collects data about each of multiple content items. Data collector 134 may examine multiple sources of data in order to collect the data, such as searching search logs indicating user behavior relative to a content item, submitting search queries to search engine 140 to perform searches and analyzing the results of those searches, and analyzing text of certain portions of the content items.

Some of information collected from external data sources include search engine results using certain keywords as search terms, such as people names, company names, job titles, job skills, salary, learning-related keywords, etc. Each search engine result may indicate a ranking of a content item from the website in question along with, optionally, a page number of the page on which the content item was found. Data collector 134 may also compare two search results that have the same content item and that are generated using the same search query, but that were generated at different times, such as a month apart. Data collector 134 may determine, based on the two search results, whether the ranking of the content item changed ('+' for a positive change; '−' for a negative change) and, if so, optionally, by how much, which may be measured, for example, based on absolute ranking change (e.g., $11^{th}$ place−$4^{th}$ place=+7 change) or based on page number change (e.g., $2^{nd}$ page−$3^{rd}$ page=−1 change).

Content Item Scorer

For each content item, content item scorer 136 generates a score for the content item based on the data collected by data collector 134 for that content item. As described in more detail herein, content item scorer 136 may implement a rule-based model or a machine-learned model. The rule-based model may be similar to the machine-learned model, except that the weights or coefficients for attributes that are considered in generating a score are established manually, instead of being determined using a machine-learning technique.

As described in more detail herein, a score for a content item may take into account one or more attributes pertaining to the content item itself and, optionally, one or more attributes pertaining to a combination of the content item and a source page (i.e., that links (or might link) to the content item). Thus, content item scorer 136 may generate multiple scores for a content item, one score for each content item-source page pair.

Linker

For a particular web page, linker 138 uses the scores relative to multiple candidate content items to select a subset of the candidate content items to which the particular web page should include a link (e.g., a URL). For example, linker 138 may rank the multiple candidate content items by score and select the top N candidate content items. Linker 138 then includes a link in the particular web page for each content item in the subset.

In an embodiment, linker 138 considers one or more criteria (other than scores) when including links in a web page to one or more content items. An example criterion includes a number of other web pages that already contain a link to the content item. This criterion may be used to ensure that the same content item is not linked to by all, most, or a relatively large plurality of web pages of a web site.

In an embodiment, linker 138 uses multiple scores for a content item to rank the content item relative to other candidate content items. One of the multiple scores may be score generated by content item scorer 136. Other scores may be generated by other components and may reflect some other value of the content item. For example, another score for a content item may indicate a relevance of subject matter of the content item to an entity associated with the web page that might include a link to the content item. As a specific example, a content item may be about a particular job listing that specifies a particular skill. The web page may be a profile page of a user that recently updated the profile page to specify the particular skill. Thus, it may be important to include a link to the content item even if a score (generated by content item scorer 136 that takes into account other attributes of the content item) indicates that a link should not be included to the content item.

Example Link Structure

Figure 2B:
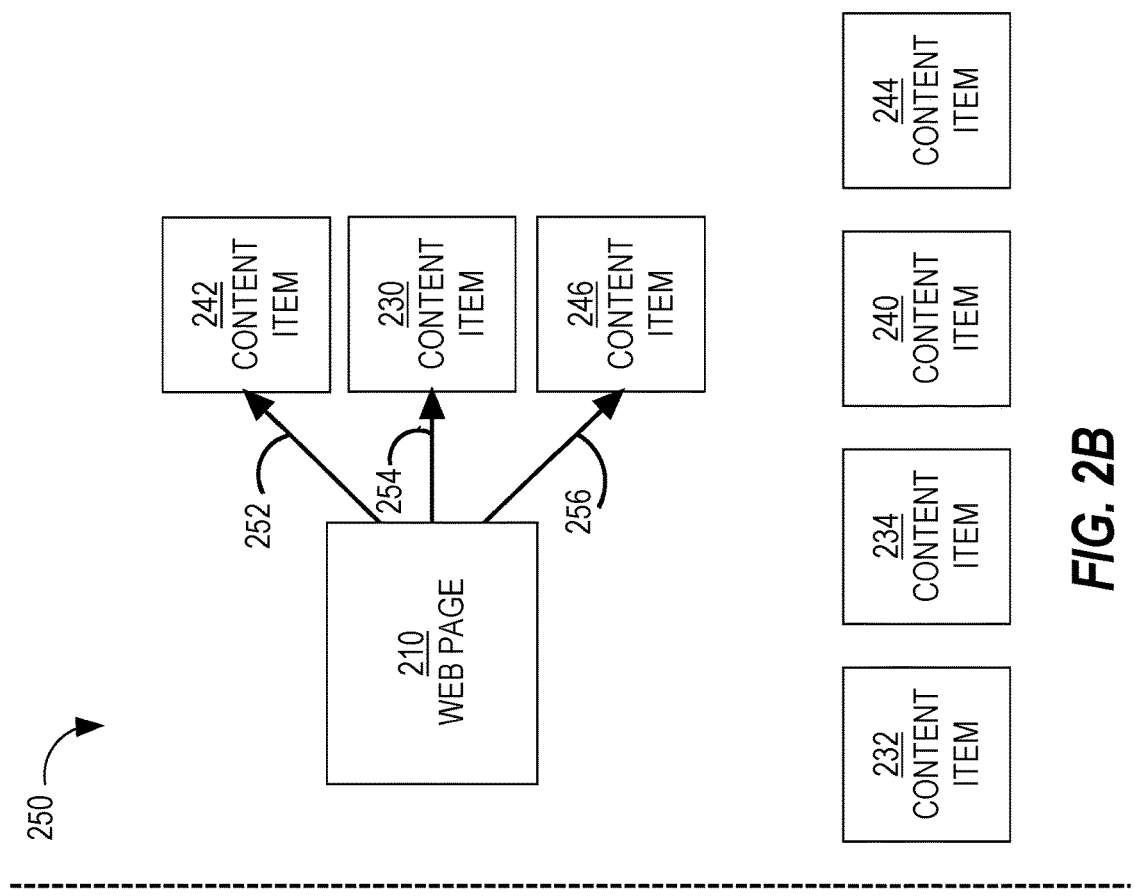
FIGS. 2A-2B are block diagrams that depict, respectively, an example link structure before an update to links from a web page and an example link structure after the update to links from the web page, in an embodiment.
Figure 2A:
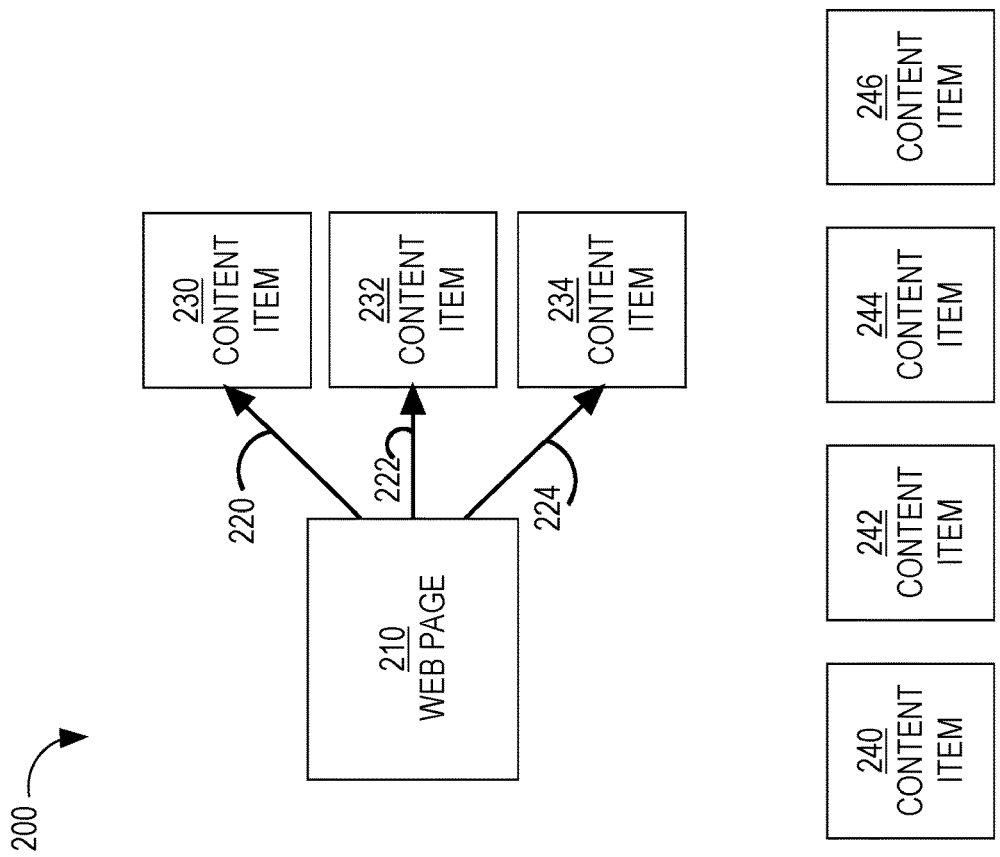

FIGS. 2A-2B are block diagrams that depict, respectively, an example link structure 200 before an update to links from a web page 210 and an example link structure 250 after the update to links from the web page 210, in an embodiment. In FIG. 2A, web page 210 includes links 220-224 to, respectively, content items 230-234. FIG. 2A also depicts candidate content items 240-246 that are not currently linked to by web page 210. One or more of candidate content items 240-246 may be linked to by one or more other web pages (not depicted).

Data collector 134 collects data about each of content items 230-234 and candidate content items 240-246. Content item scorer 136 generates a score for each of the content items. Linker 138 ranks the content items by the score, selects three content items, and updates web page 210 to include links 252-256 to those three content items, respectively. In FIG. 2B, the three content items are content items 242, 230, and 246. Thus, the second version of web page 210 no longer includes a link to either of content items 232 or 234. Also, in this example, the slots in web page 210 to include links to content items are ordered. Thus, while content item 230 may be considered to be in the "first" slot of web page 210 under link structure 200, content item 230 moved to the "second" slot of web page 210 under link structure 250.

Scoring Content Items

Multiple attributes or factors may be considered when scoring a content item. Example attributes of a particular content item include:
a. search volume: a number of times that the particular content item has been searched in the past time period (e.g., past day, week, or month, etc.), where each search involves using a title of the content item as keyword(s) in the corresponding search query
b. bounce rate: a number of times users return to a source page (i.e., that links/linked to the particular content item) when the users selected the link to the particular content item vs. a number of times users selected a link to the particular content item
c. average staying time: an average time (e.g., in seconds) a user "stays" with the particular content item (or "stays on" the web page, if the particular content item is a web page) before changing the view (e.g., by clicking on a link in the particular content item, returning to the source page, closing an application that presents (e.g., displays) the particular content item, typing in a new URL in a web browser, or launching a different application)
d. average interactions: an average number of interactions that users have with the particular content item, such as average number of clicks on items within the particular content item, an average number of scrolling actions, an average number of selections of a user interface of the particular content item, etc.
e. number of unique visitors: a number of distinct users visiting/requesting the particular content item during a time period (e.g., day, week, month, year)
f. freshness: how frequently the particular content item is updated (e.g., two times every time period (e.g., week)); generally, content items that are web pages may be updated more frequently than content items that contain no links
g. multimedia information: such as a number of images within the particular content item, a number of videos within (or linked to by) the particular content item
h. URL count: a number of links (e.g., URLs) in the particular content item
i. Named entity count: a number of named entities (e.g., people, cities, organizations (e.g., companies, sports teams, etc.) contained in (or referenced by) the particular content item
j. Title word count: a number of occurrences of one or more title words (i.e., words of a title of the particular content item) in the particular content item
k. Current search ranking: a ranking of the particular content item in a search results page when a title of the particular content item is (or is included in) a search query that triggers the search results page
l. Current search ranking page: a numbered search results page on which the particular content item appears when a title of the particular content item is (or is included in) a search query that triggers the search result (e.g., if the particular content item's overall ranking is twelve and each page of a search result only contains ten entries, then the search ranking page for this particular content item is two (because the particular content item appears on the second search results page)
m. Number of website content items in search result: a number of content items of the website in total appear in the top X search result when a title of the particular content item is (or is included in) a search query that triggers the search result, where X can be changed
n. Clustering: whether multiple content items of the website appear on the same search results page when a title of the particular content item is (or is included in) a search query that triggers the search result
o. Number of internal backlinks: a number of internal links from webpages of the website to the particular content item Other example attributes include numerical attributes related to a title of a content item (e.g., a page title, if the content item is a web page). Such numerical attributes include a number of words in the title, a number of characters in the title, a number of spaces in the title, a number of special characters in the title, and a number of capitalized characters in the title.

Other attributes of a content item may be related to a relationship between the content item and one or more source pages that link (or might link in the future) to the content item. Examples of such attributes for a combination of a source page and a particular content item include:
a. Content relevance: a similarity between textual content of a source page and the particular content item, such as a cosine similarity based on TF-IDF metrics of two content items
b. Selection rate (e.g., click-through rate or CTR): a number of times that users have landed on the source page and moved to the particular content item divided by a number of times that users have landed on the source page; if there is no link between the source page and the particular content item, then this factor will have a null or "unknown" value.

c. Pair-wise bounce rate: a number of times that users landed on the source page, then moved to the particular content item and then went back to the source page divided by a number of times that users landed on the source page and then moved to the particular content item; if there is no link between the source page and the particular content item, then this factor will have a null or "unknown" value.

d. Distinct users of a link: a number of distinct users that moved from the source page to the particular content item; if there is no link between the source page and the particular content item, then this factor will have a null or "unknown" value Rule-Based Scoring Model Scoring a content item may be performed in a number of ways. For example, rules may be established that weight certain attributes for each content item and combine the weighted attributes to generate a score. For example, a content item with a bounce rate over a particular threshold may result in negative three points, the content item having an average staying time over a second threshold may result in five points, and the content item having a number of unique visitors greater than a third threshold may result in six points (bringing the total to eight points). The score of the content item is used to rank the content item relative to other content items having their respective scores.

Rules may be determined manually by analyzing characteristics of highly ranked content items. For example, it may be determined that 56% of content items with a bounce rate below a first threshold and a search volume over a second threshold end up in the top ten of search results for certain keywords.

A rule-based scoring model has numerous disadvantages. One disadvantage is that it fails to capture nonlinear correlations. Another issue with a rule-based scoring model is that the hand-selection of values is error-prone, time consuming, and non-probabilistic. Hand-selection also allows for bias from potentially mistaken business logic. A third disadvantage is that output of a rule-based scoring model is an unbounded positive or negative value. The output of a rule-based scoring model does not intuitively map to a classification. In contrast, machine learning methods are probabilistic and therefore can give intuitive classifications or scores.

Machine-Learned Scoring Model

In an embodiment, a scoring model is generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical or classification model that is trained based on a history of attribute values associated with content items and, optionally, with source pages to those content items. The machine-learned model is trained based on multiple attributes (or factors) described herein. In machine learning parlance, such attributes are referred to as "features." To generate and train a machine-learned model, a set of features is specified and training data is generated. The set of features dictates how data that data collector 134 collects is processed in order to generate the training data. For example, if a feature is bounce rate of a content item, then (1) a number of times in which users requested a content item from a source page during a period of time and (2) a number of times in which users returned to the source page (e.g., immediately or sooner thereafter) during that period of time are determined from access data pertaining to the content item.

In an embodiment, a new machine-learned scoring model is generated regularly, such as every month, week, or other time period. Thus, the new machine-learned scoring model may replace a previous machine-learned scoring model and may be used to score the same (or similar) content items for web pages of a website. In a related embodiment, it is determined an extent to which search result rankings have changed for content items available through the website. If search result rankings for multiple content items have not changed significantly (e.g., an average of less than 1.3 in absolute ranking change), then a new machine-learned scoring model is not generated. The one or more criteria for determining a significant change in ranking may change from time to time.

Label Generation

Training data includes multiple training instances, each corresponding to a different content item. Each training instance includes a label. During the training phase, a machine-learned model captures the correlation between feature values and labels. The correlation is reflected, at least in part, on weights or coefficients that are machine-learned for each feature.

The type of label used in training data indicates the type of machine-learned model. For example, a label may be 0 or 1:1 indicating a positive change in ranking (e.g., $10^{th}$ place in a prior search result to $4^{th}$ place in the most recent search result) and 0 indicating no change in ranking or a negative change in ranking. Thus, a machine-learned model generated using such label data may be a binary classification model. As another example, a label may be −1, 0, or 1:1 indicating a positive change in ranking, 0 indicating no change in ranking, and −1 indicating a negative change in ranking. Thus, a machine-learned model trained using such label data may be a ternary classification model. Even though the machine-learned model may be a classification model, the machine-learned model may still output a continuous value; however, a threshold value may be defined such that an output value above that threshold value is considered to be in one class and an output value below that threshold value is considered to be in another class.

As another example, a label may be value in a range of continuous (e.g., floating point) values, such as between 0 and 1 or between 0 and 100. Such a label may indicate a magnitude change in ranking in the content item, such as $12^{th}$ place ranking to a $2^{nd}$ place ranking, which might have a magnitude change of 10 as the label. If change in pages are tracked, then an example of content item having a $4^{th}$ page ranking at time A and then having a $1^{st}$ page ranking at time B would have a magnitude change of 3 as the label. Alternatively, a current ranking of the content item may be used as a label (e.g., $1^{st}$ place ranking may be 1 or 0, whereas a $20^{th}$ place ranking may be 20 or 19).

Depending on the type of label, data collector 134 may classify some actual changes in ranking of a content item as no change. For example, if the actual change in ranking of a content item is less than five spots, then a label for that content item may be 0, indicating no change. Otherwise, a label for that content item may be 1 (indicating a positive change) or −1 (indicating a negative change). As another example, if the page on which a content item appeared did not change from one search result to another, then a label for that content item may be 0, indicating no change. Otherwise, a label for that content item may be 1 (indicating a positive page change) or −1 (indicating a negative page change). As another example, actual changes are only tracked for content items that initially (or subsequently) appear on the first or second page of a search result. Other actual changes are ignored (and, for example, the corresponding content item is labeled with a 0, indicating no change), such as (a) a content item that initially appeared on the $50^{th}$ page of a first search result and subsequently appeared on the $3^{rd}$ page of a second search result or (b) a content item's first ranking being less than a total ranking of 30 or the difference between a content item's first and second rankings being less than five.

Example Scoring System

Figure 3:
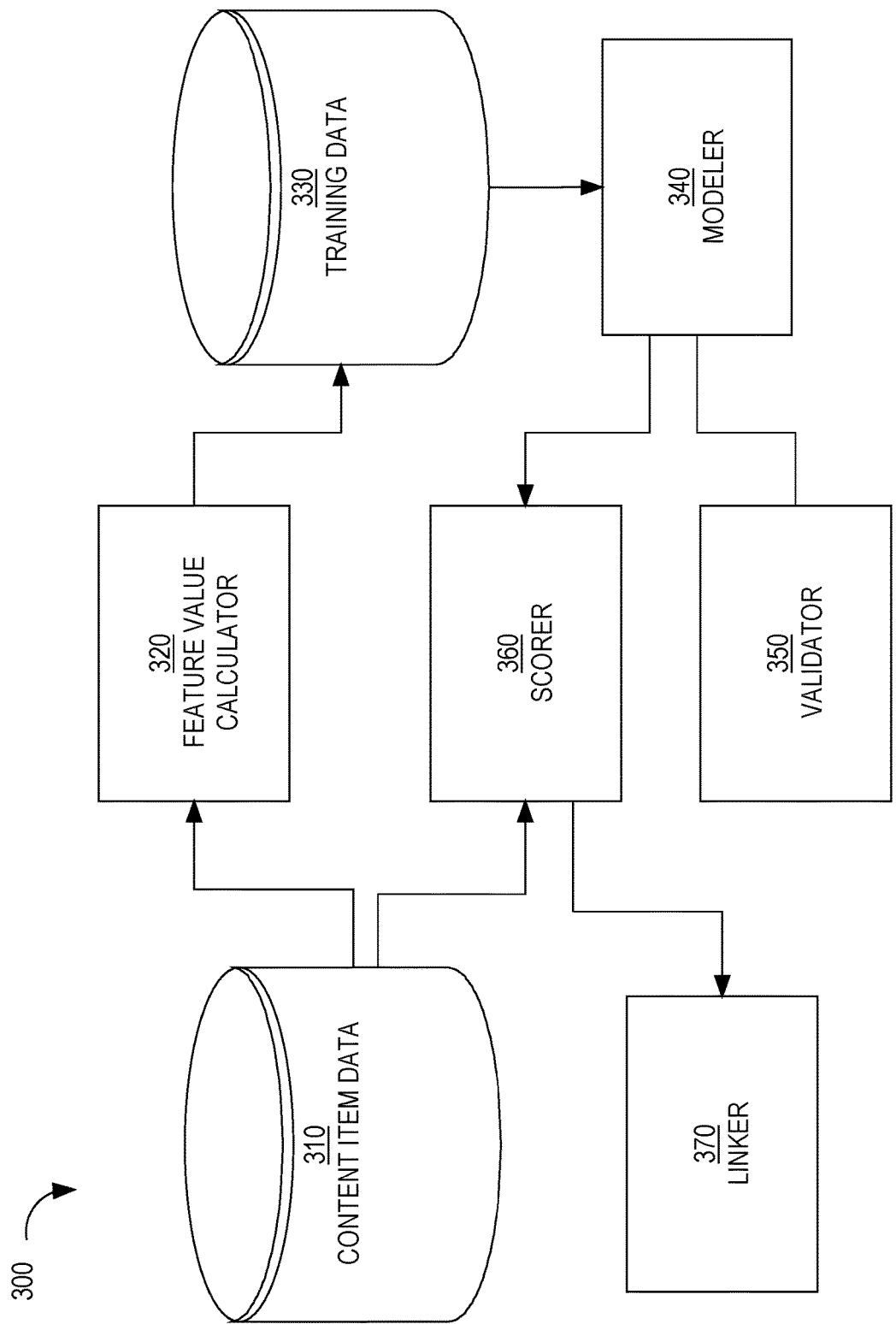
FIG. 3 is a flow diagram that depicts a process for selecting content items to which a web page will link, in an embodiment.

FIG. 3 is a block diagram that depicts an example scoring system 300 for scoring content items, in an embodiment. System 300 includes content item data 310, feature value calculator 320, training data 330, modeler 340, validator 350, scorer 360, and linker 370. Feature value calculator 320, modeler 340, validator 350, scorer 360, linker 370 are implemented in software, hardware, or any combination of software and hardware.

Although different elements of system 300 are depicted as single entities, each element may be implemented on either a single computing device or across multiple computing devices. Also, multiple elements (e.g., scorer 360 and linker 370) may be implemented on the same computing device. Even though FIG. 3 depicts elements as being connected to one another, each connection might not be a direct connection, but could represent one or more intermediate hardware and/or software elements.

Content item data 310 includes data about each content item of multiple content items. Different portions of content item data 310 may have been collected by data collector 134 from different data sources, whether internal or external, such as a third-party search engine or a log of user accesses to various content items. Content item data 310 also indicates, for each content item, one or more rankings of the content item. If a content item is associated with multiple rankings, then the multiple rankings may be rankings of the content item at different times in the past and/or rankings of the content item from different search engines.

Feature value calculator 320 analyzes content item data 310 and generates training data 330. For example, a feature may be an average staying time of requestors of a content item. Thus, feature value calculator 320 may analyze multiple access logs pertaining to multiple requestors of the content item during a period of time (e.g., the last month). Feature value calculator 320 may total the staying times of all requestors of the content item during the period of time and divide by the total number of such requestors. Feature value calculator 320 includes a label for each training instance, the label indicating a ranking or being based on one or more rankings, such as whether a positive or negative change in rankings occurred for the content item over the same (or different) period of time.

Feature value calculator 320 may generate multiple sets of training data 330, each set used to generate a different scoring model. For example, as described in more detail below, one part of training data 330 may be used to train a scoring model for one set of content items and another part of training data 330 may be used to train a scoring model for another set of content items. The different scoring models may be based on different features. Thus, the training data for one scoring model may have more features than the training data for another scoring model. Some of the features used for both scoring models may be the same.

Modeler 340 implements one or more machine learning techniques to generate a scoring model based on training data 330, or at least a portion thereof. One machine learning technique involves generating random values for initial coefficient values for the features. The random values may be constrained to a certain range, such as between 0 and 1 or between 0 and 10.

Validator 350 validates the generated scoring model using a portion of training data 330, preferably a portion that was not used to generate the scoring model. Validator 350 determines an error rate of the scoring model. If the error rate is less than a particular threshold, then scorer 360 (which comprises the scoring model) is used to score content items whose data may be reflected in content item data 310 or whose data may be stored separately. For example, feature value calculator 320 may (1) generate feature values based on data about content items (e.g., reflected in content item data 310, as depicted in FIG. 3) that are to be scored and (2) store the feature values for those content items in storage to which scorer 360 has access. Alternatively, instead of a pull model approach where scorer 360 retrieves the feature values from storage, feature value calculator 320 may transmit ("push") the feature values to scorer 360 for scoring the content items.

Linker 370 takes scores generated by scorer 360 as input and determines which of the corresponding scored content items will be linked to by one or more web pages of a website. The score for a particular content item may be used to determine whether it should be linked to by multiple web pages. Or, the same content item may be scored multiple times by scorer 360, once for each web page that can contain a link to the content item.

Different Scoring Models

In an embodiment, multiple scoring models (whether rule-based or machine-learned) are constructed. Each scoring model may score a different set of content items. Content items may be assigned to a set depending on different criteria, such as type of content item.

"Type" may refer to the type of content, such as text, audio, or video, or to a file type. For example, one scoring model may be constructed for textual content items (or content items whose primary content is text), another scoring model may be constructed for audio content items (or content items whose primary content is audio), and another scoring model may be constructed for video content items (or content items whose primary content is video.

"Type" may refer to type of subject matter. For example, some content items may be classified as job listing pages that list one or more job openings from one or more organizations; some content items may be classified as user profile pages, each containing profile information about a user, at least some of which information was provided by the user, such as past and current employers, past academic degrees earned and institutions attended, skills, endorsements, recommendations, and interests.

Some content items may be classified as company pages, each containing profile information about an organization (whether public/private, profit/non-profit, educational/government/business, etc.), such as number of employees, geographic location of its headquarters and/or of each office, current stock price (if applicable), total revenue in past year (if known), number of new hires, headcount by job function, available job openings, and notable alumni of organization.

Some content items may be classified as learning pages, each containing information about a different topic for which learning materials are available. Example topics include the basics of programming, graphic design, IT management, onboarding talent, improving performance reviews, and developing leaders.

Some content items may be classified as job title pages, each containing information about a set of job openings associated with a particular job title or a set of job titles associated with a particular job function.

One reason for constructing different scoring models for different sets of content items is because some features may be applicable to some set or class of content items but not other sets or classes. For example, some content items are, or contain, video content. A video-related attribute/feature may be an amount of time watching a video within a content item. Such an attribute/feature is not applicable to content items that do not contain video content.

Another reason for constructing different scoring models is because different types of content items may have different structure and formatting and/or different type/variety of content.

Multiple Slots on a Webpage

In an embodiment, a webpage includes multiple slots for inserting links. Each slot corresponds to a different link. A link to a content item may be assigned to a slot of a web page when the web page is requested or may be assigned after the content item is scored (e.g., by content item scorer 136) along with other candidate content items for the web page. There may be many candidate content items to which the web page can contain a link. Linker 138 selects a subset of the candidate content items and includes, in each slot, a link to a content item in the subset.

In an embodiment, a web page includes different sets of one or more slots, each set of slots corresponding to a different set of one or more content items. For example, a web page may include a first set of one or more slots for profile pages, a second set of one or more slots for company pages, and a third set of one or more slots for job listing pages. The candidate content items corresponding to each set of slots may have been scored using a different scoring model.

If no source page-content item attribute/feature is considered when scoring content items, then content item scorer 136 generates a single score for each candidate content item. If there is at least one source page-content item attribute/feature considered when scoring candidate content items, then content item score 136 generates a score for each web page-candidate content item pair. Thus, some candidates content item may be scored multiple times, each time in association with a different web page. For each web page, however, only those candidate content items that have been scored relative to that web page may be considered when selecting which candidate content items will be linked to by the web page. Thus, each web page may be associated with a ranked list of candidate content items to which the web page can link. The highest ranked candidate content items corresponding to a web page may be selected and a link to each of those highest ranked candidate content items inserted into the web page, which may involve removing links to other content items to which the web page previously linked.

In an embodiment, different web pages include different numbers and/or types of slots. Thus, one web page may include two slots for profile pages and three slots for company pages, while another web page may include four slots for job listing pages and two slots for company pages.

Example Process

Figure 4:
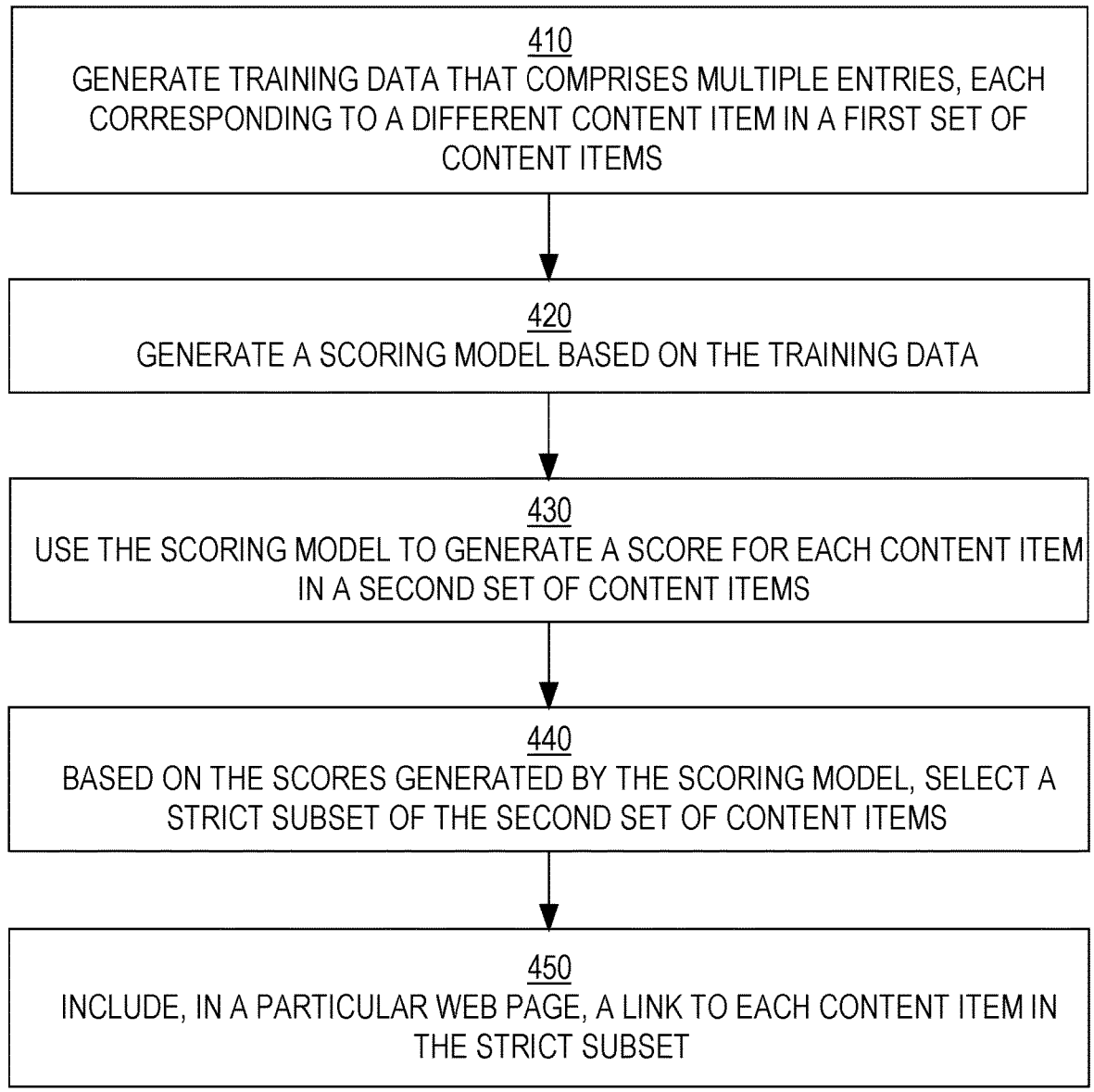
FIG. 4 is a block diagram that depicts an example scoring system for scoring content items, in an embodiment.

FIG. 4 is a flow diagram that depicts a process 400 for selecting content items to which a web page will link, in an embodiment. Process 400 may be implemented by different components of server system 130.

At block 410, training data that comprises multiple entries is generated. Each entry corresponds to a different content item in a first set of content items and includes multiple feature values of the corresponding content item. Each entry includes a label that that is based on a ranking of the corresponding content item in one or more search results. In one embodiment, the label is based on multiple (e.g., two) rankings by determining a difference between two rankings of the content item in different search results. Data collector 134 may generate the training data based on data retrieved from one or more data sources, such as a data source that is internal to server system 130 and/or a data source that is external/remote relative to server system 130.

At block 420, a scoring model is generated based on the training data using one or more machine learning techniques. Content item scorer 136 may include the scoring model.

At block 430, for each content item in a second set of content items, multiple feature values associated with the content item are input into the scoring model, which generates a result (e.g., a score) for the content item. Block 430 may be performed by content item scorer 136.

At block 440, based on the results generated by the scoring model, a strict subset of the second set of content items is selected for a particular web page. Block 440 may be performed by content item scorer 136, linker 138 or another component of server system 130.

At block 450, a link to each content item in the strict subset is included in the particular web page. Block 450 may be performed by linker 138.

In a different embodiment, instead of generating training data and generating/training a machine-learned scoring model based on the training data, a rule-based scoring model may be constructed and used to score content items that are candidates for being linked to by a web page.

In a related embodiment, the particular web page includes one or more slots for a different (third) set of content items that is different than the second set of content items. For example, there may be no overlap in content items between the second and third set. As a specific example, the second set of content items may be user profile pages while the third set of content items may be company profile pages. Thus, blocks 420-450 may be performed relative to the third set of content items, where links to a strict subset of the third set of content items are also inserted into the particular web page, such that the particular web page, when published by the website, includes (1) one or more links to content items in the strict subset of the second set of content items and (2) one or more links to content items in the strict subset of the third set of content items.

In this embodiment where there are different sets of slots for different sets (e.g., corresponding to different types) of content items, the scoring model that is used to generate scores for the third set of content items may be the same as, or different than, the scoring model that is used to generate scores for the second set of content items. For example, one scoring model may be used to score the second set of content items and another scoring model may be used to score the third set of content items.

Multiple Search Engines

In an embodiment, search results generated by multiple search engines are considered. For example, server system 130 (or a related component) generates and sends an identical search query to multiple (e.g., third-party) search engines and receives, as a result, a search result from each search engine. The search results may be used to identify a ranking of a particular content item within each search result. For example, a particular content item is ranked $4^{th}$ in a first search result and is ranked $11^{th}$ in a second search result. The rankings may be averaged if search ranking is an attribute or feature that is considered when scoring a content item. If there are more than two search engine results for a particular content item, then the median ranking may be used to score the particular content item or to train a scoring model based on features of the particular content item.

In a related embodiment, a ranking that is associated with a content item and that is based on multiple search results is weighted. Thus, search results from one search engine may be weighted higher than search results from another search engine. For example, a content item might be ranked $4^{th}$ in a search result generated by a first search engine and ranked $10^{th}$ in a search result generated by a second search engine. Because search results from the first search engine are weighed more than search results from the second search engine, then a final ranking associated with the content item might be $6^{th}$, rather than $7^{th}$ if an average was calculated. The magnitude of the weight may be based on one or more factors, such as the relative frequency of visits from the respective search engines. For example, 75% of visitors to a web site that come as a result of selecting a link in a search result may originate from a first search engine and 20% of visitors to the web site that come as a result of selecting a link in a search result may originate from a second search engine. In this example, rankings from the first search engine may be weighted 3.75 (75/20) higher than rankings from the second search engine.

Another way to incorporate multiple search engine results is by considering each search engine's result as a vote for the label. For example, if a content item's ranking increases in the majority of pairs of search engine results (each pair of search engine results generated by a different search engine), then a label for that content item is positive. Conversely, if a content item's ranking decreases in the majority of pairs of search engine results, then a label for that content item is negative.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
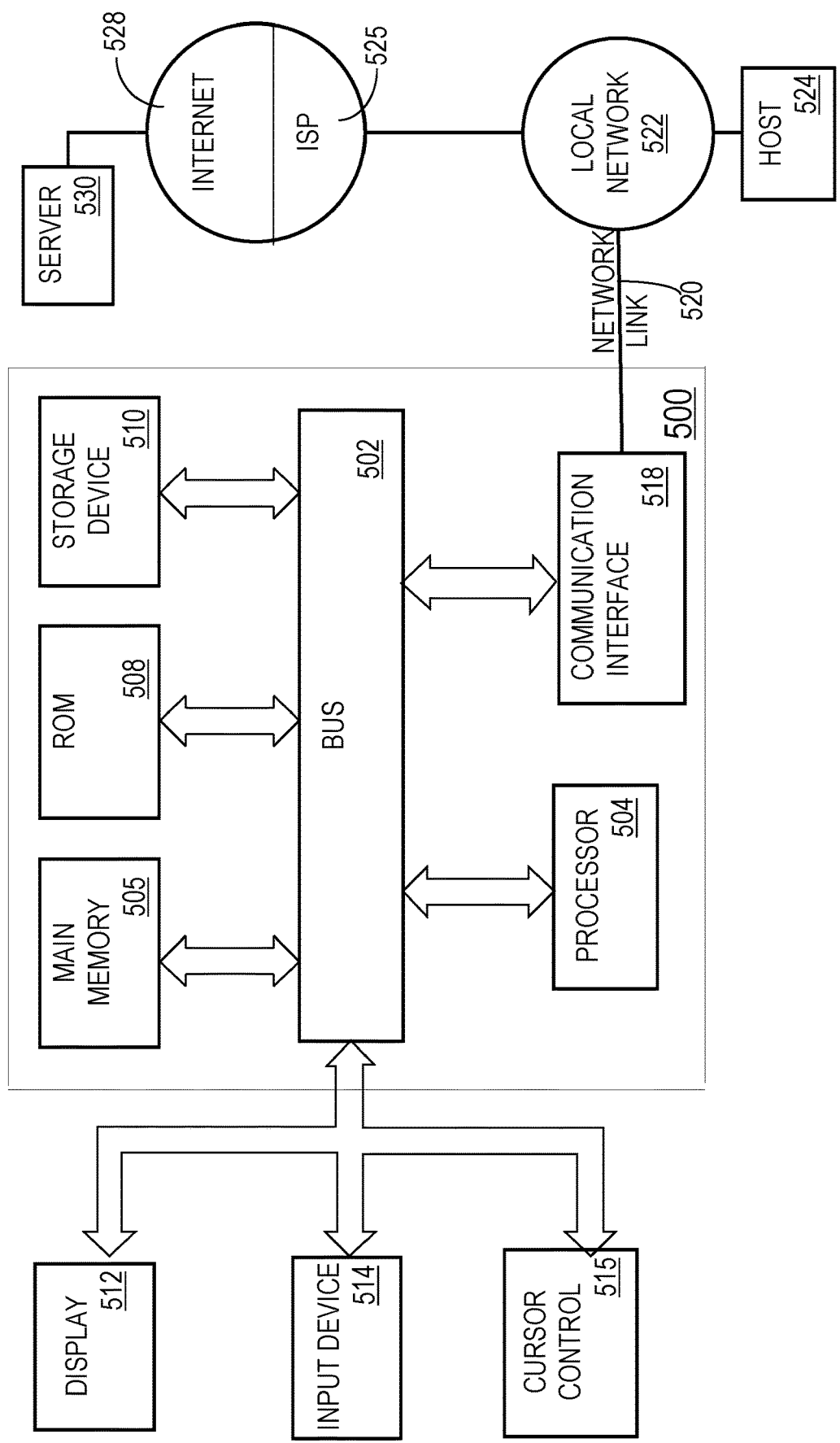
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating training data for a machine-learned scoring model that comprises a plurality of features related to content items, wherein the training data comprises a plurality of entries, each corresponding to a different content item of a first plurality of content items;
   wherein, for each entry of the plurality of entries, a label in said each entry that corresponds to a content item is based on a ranking of said content item in one or more search engine results;
   training the machine-learned scoring model based on the training data;
   for each content item of a second plurality of content items, inputting, into the machine-learned scoring model, multiple attribute values associated with said each content item, wherein the machine-learned scoring model generates a result for said each content item based on the multiple attribute values, wherein the result indicates a score of said each content item;
   based on a plurality of results generated by the machine-learned scoring model for the second plurality of content items, determining, for a particular web page, a strict subset of the second plurality of content items to which the particular web page will include one or more links;
   including the one or more links in the particular web page;
   wherein the method is performed by one or more computing devices.

2. The method of claim 1, wherein the plurality of features is based on two or more of: a bounce rate of a content item, search volume of the content item, average staying time of the content item, number of unique visitors of the content item, freshness of the content item, number of URLs in the content item, number of interactions that visitors have with the content item, number of links in the content item, number of named entities in the content item, current search ranking of the content item, current search ranking page of the content item, or number of internal backlinks of the content item.

3. The method of claim 1, wherein the plurality of features is based on one or more of: a content relevance between a content item and a source page that contains a link to the content item, selection rate between the source page and the content item, a pair-wise bounce rate of the content item and the source page, number of distinct users that requested the content item through the source page.

4. The method of claim 1, wherein the strict subset is a first strict subset, further comprising:
   determining, for a second web page that is different than the particular web page, a second strict subset of the plurality of content items to which the second web page will include one or more second links;
including the one or more seconds links in the second web page;
wherein the second strict subset is different than the first strict subset.

5. The method of claim 1, wherein one of the multiple attribute values associated with said each content item of the plurality of content items corresponds to an attribute based on a combination of said each content item and the particular web page.

6. The method of claim 1, further comprising:
determining, in a first search result, a first ranking of a particular content item in the first plurality of content items;
determining, in a second search result that was generated after the first search result, a second ranking of the particular content item;
based on a difference between the first ranking and the second ranking, generating a particular label for the particular content item;
including the particular label in the training data prior to training the machine-learned scoring model based on the training data.

7. The method of claim 1, further comprising:
for each content item of a third plurality of content items, inputting, into a second machine-learned scoring model, a plurality of attribute values associated with said each content item, wherein the second machine-learned scoring model generates a result for said each content item based on the plurality of attribute values;
based on a second plurality of results generated by the second machine-learned scoring model for the third plurality of content items, determining, for the particular web page, a strict subset of the third plurality of content items to which the particular web page will include one or more second links;
including the one or more second links in the particular web page.

8. The method of claim 7, wherein the second machine-learned scoring model is different than the machine-learned scoring model.

9. The method of claim 7, wherein the second plurality of content items contain data of a first type and the third plurality of content items contain data of a second type that is different than the first type and do not contain data of the first type.

10. The method of claim 1, further comprising:
generating second training data for a second machine-learned scoring model that comprises a second plurality of features related to content items, wherein the second training data comprises a second plurality of entries, each corresponding to a different content item of a third plurality of content items;
wherein, for each entry of the second plurality of entries, a label in said each entry that corresponds to a content item, in the third plurality of content items, is based on a ranking of said content item in one or more second search engine results;
training the second machine-learned scoring model based on the second training data;
for each content item of a fourth plurality of content items, inputting, into the second machine-learned scoring model, a plurality of attribute values associated with said each content item, wherein the second machine-learned scoring model generates a result for said each content item based on the plurality of attribute values;
based on a second plurality of results generated by the second machine-learned scoring model for the fourth plurality of content items, determining, for a second web page, a strict subset of the fourth plurality of content items to which the second web page will include one or more second links;
including the one or more second links in the second web page.

11. The method of claim 1, further comprising making available, on a website, the particular web page and content items in the strict subset.

12. A method comprising:
for each content item of a first plurality of content items, inputting, into a first scoring model, a first plurality of attribute values associated with said each content item, wherein the first scoring model generates a result for said each content item based on the first plurality of attribute values, wherein the result indicates a score of said each content item;
based on a first plurality of results generated by the first scoring model for the first plurality of content items, determining, for a particular web page, a strict subset of the first plurality of content items to which the particular web page will include one or more first links;
including the one or more first links in the particular web page;
for each content item of a second plurality of content items, inputting, into a second scoring model that is different than the first scoring model, a second plurality of attribute values associated with said each content item, wherein the second scoring model generates a result for said each content item based on the second plurality of attribute values;
based on a second plurality of results generated by the second scoring model for the second plurality of content items, determining, for the particular web page, a strict subset of the second plurality of content items to which the particular web page will include one or more second links;
including the one or more second links in the particular web page;
making the particular web page available on a website, wherein the particular web page includes the one or more first links and the one or more second links;
wherein the method is performed by one or more computing devices.

13. One or more storage media storing instructions which, when executed by one or more processors, cause:
generating training data for a machine-learned scoring model that comprises a plurality of features related to content items, wherein the training data comprises a plurality of entries, each corresponding to a different content item of a first plurality of content items;
wherein, for each entry of the plurality of entries, a label in said each entry that corresponds to a content item is based on a ranking of said content item in one or more search engine results;
training the machine-learned scoring model based on the training data;
for each content item of a second plurality of content items, inputting, into the machine-learned scoring model, multiple attribute values associated with said each content item, wherein the machine-learned scoring model generates a result for said each content item based on the multiple attribute values, wherein the result indicates a score of said each content item;

based on a plurality of results generated by the machine-learned scoring model for the second plurality of content items, determining, for a particular web page, a strict subset of the second plurality of content items to which the particular web page will include one or more links;

including the one or more links in the particular web page.

14. The one or more storage media of claim 13, wherein the plurality of features is based on two or more of: a bounce rate of a content item, search volume of the content item, average staying time of the content item, number of unique visitors of the content item, freshness of the content item, number of URLs in the content item, number of interactions that visitors have with the content item, number of links in the content item, number of named entities in the content item, current search ranking of the content item, current search ranking page of the content item, or number of internal backlinks of the content item.

15. The one or more storage media of claim 13, wherein the plurality of features is based on one or more of: a content relevance between a content item and a source page that contains a link to the content item, selection rate between the source page and the content item, a pair-wise bounce rate of the content item and the source page, number of distinct users that requested the content item through the source page.

16. The one or more storage media of claim 13, wherein the strict subset is a first strict subset, wherein the instructions, when executed by the one or more processors, further cause:

determining, for a second web page that is different than the particular web page, a second strict subset of the plurality of content items to which the second web page will include one or more second links;

including the one or more seconds links in the second web page;

wherein the second strict subset is different than the first strict subset.

17. The one or more storage media of claim 13, wherein one of the multiple attribute values associated with said each content item of the plurality of content items corresponds to an attribute based on a combination of said each content item and the particular web page.

18. The one or more storage media of claim 13, wherein the instructions, when executed by the one or more processors, further cause:

determining, in a first search result, a first ranking of a particular content item in the first plurality of content items;

determining, in a second search result that was generated after the first search result, a second ranking of the particular content item;

based on a difference between the first ranking and the second ranking, generating a particular label for the particular content item;

including the particular label in the training data prior to training the machine-learned scoring model based on the training data.

19. The one or more storage media of claim 13, wherein the instructions, when executed by the one or more processors, further cause:

for each content item of a third plurality of content items, inputting, into a second machine-learned scoring model, a plurality of attribute values associated with said each content item, wherein the second machine-learned scoring model generates a result for said each content item based on the plurality of attribute values;

based on a second plurality of results generated by the second machine-learned scoring model for the third plurality of content items, determining, for the particular web page, a strict subset of the third plurality of content items to which the particular web page will include one or more second links;

including the one or more second links in the particular web page.

20. The one or more storage media of claim 13, wherein the instructions, when executed by the one or more processors, further cause:

generating second training data for a second machine-learned scoring model that comprises a second plurality of features related to content items, wherein the second training data comprises a second plurality of entries, each corresponding to a different content item of a third plurality of content items;

wherein, for each entry of the second plurality of entries, a label in said each entry that corresponds to a content item, in the third plurality of content items, is based on a ranking of said content item in one or more second search engine results;

training the second machine-learned scoring model based on the second training data;

for each content item of a fourth plurality of content items, inputting, into the second machine-learned scoring model, a plurality of attribute values associated with said each content item, wherein the second machine-learned scoring model generates a result for said each content item based on the plurality of attribute values;

based on a second plurality of results generated by the second machine-learned scoring model for the fourth plurality of content items, determining, for a second web page, a strict subset of the fourth plurality of content items to which the second web page will include one or more second links;

including the one or more second links in the second web page.

* * * * *